H. PAULING.
ELECTRIC FURNACE.
APPLICATION FILED MAR. 17, 1909.

999,586.

Patented Aug. 1, 1911.

Witnesses.

Inventor.

UNITED STATES PATENT OFFICE.

HARRY PAULING, OF GELSENKIRCHEN, GERMANY, ASSIGNOR TO THE FIRM OF SALPETERSÄURE INDUSTRIE-GESELLSCHAFT, GES. M. B. H., OF GELSENKIRCHEN, GERMANY.

ELECTRIC FURNACE.

999,586.   Specification of Letters Patent.   Patented Aug. 1, 1911.

Application filed March 17, 1909. Serial No. 483,969.

*To all whom it may concern:*

Be it known that I, HARRY PAULING, managing director, a subject of the King of Saxony, and resident of 84 Wilhelmstrasse, in Gelsenkirchen IV., Westphalia, German Empire, have invented certain new and useful Improvements in Electric Furnaces, of which the following is a specification.

This invention relates to electric furnaces for the purpose of treating gases and gas-mixtures by means of a long, steady arc; and it also relates to processes of treating gaseous mixtures, as, for example, in the manufacture of nitrogen oxids, wherein the gaseous mixture to be treated is introduced into the path of an electric arc at a plurality of points between a pair of electrodes, is caused to travel longitudinally of said arc for a relatively short distance, and is removed from said arc at a plurality of points along the arc, the gases in the immediate vicinity of the electrodes being separately removed if desired.

The essential feature of the apparatus of the present invention consists in the construction of the furnace with a series of air-inlet orifices and gas discharge orifices alternating with each other. The gas discharge orifices nearest the electrodes preferably have means by which gases in the region of the electrodes may be separately conducted from the furnace.

The principal advantage of my new apparatus is that the velocity of the air passing through the furnace is reduced in proportion with the number of air-inlets and gas-outlets provided; the invention allows of reducing the velocity to a value which obviates all risk of "blowing out" the arc. By separately conducting away the air which comes into contact with the electrodes the advantage is obtained that impurities derived from electrodes are not mixed with the main gas current and do not enter the reaction mixture. The gas containing these impurities may be separately treated.

A construction embodying these improvements is shown in the accompanying drawing, in which—

Figure 1:
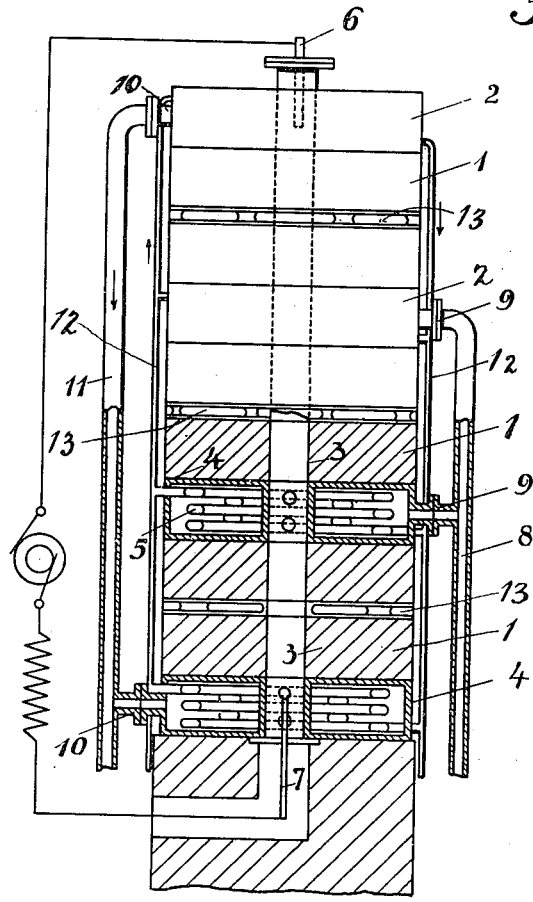
Figure 2:
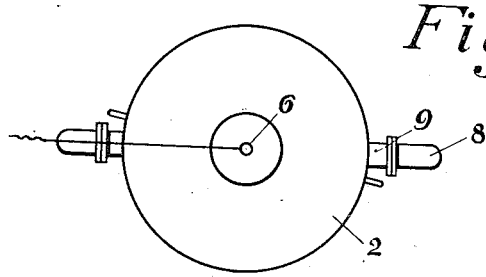

Figure 1 is a side elevation of the furnace, partly in section, and Fig. 2 a plan view thereof.

The furnace shown consists of alternate annular elements 1 and 2 surrounding a central gas shaft 3. Each element 1 has peripheral air-inlet orifices 13 permitting passage of air from the exterior of the furnace to the central gas shaft. Electrodes 6 and 7, connected to suitable electric current generating means, are positioned at opposite ends of the gas shaft, in such a manner as to permit the formation of a long steady arc extending longitudinally through the central gas shaft.

The elements 1 consist of solid fire-brick or other fire-proof material traversed by the air-inlet passages 13, but the elements 2 are hollow, and practically form annular boxes 4 with cooling coils 5 or equivalent cooling devices inside the boxes 4, for cooling the hot gases withdrawn from the field of reaction. The coils 5 are connected to mains 12, which in turn are connected with suitable means (not shown) for supplying a cooling medium.

Preferably all the elements 2 except the two nearest the electrodes 6 and 7 are connected by means of pipes 9 to a gas main 8, through which substantially uncontaminated products may be withdrawn to a suitable holder (not shown). The two elements 2 nearest the electrodes are connected by pipes 10 to a conduit 11 for the gases containing products derived from the electrodes. Conduit 11 serves therefore as means whereby the relatively impure gases drawn from the neighborhood of the electrodes, may be separately conducted away from the furnace for further treatment. Circulation of the gases through the furnace is maintained by suitable means, (not shown).

The operation of the device is obvious from the foregoing. The gases to be treated enter the furnace through the several sets of orifices 13 and pass into the central shaft where they are subjected to the action of the arc established therein. After traveling a comparatively short distance in the path of the arc and in the direction of its length, the treated gases pass out through element 2, where they are cooled, and are led off to suitable containers, the products from the immediate vicinity of the electrodes being preferably kept separate as before explained.

As is apparent, the form of apparatus, above described, is provided with a plurality of means intermediate the electrodes for introducing and for withdrawing gases. Gases entering the path of the arc travel in that path a distance sufficient for completing the desired reaction and are then withdrawn from the furnace. This arrangement permits treatment of large volumes of gases traveling at relatively low velocity.

Many modifications of the construction are possible within the scope of the invention, the essential feature being the provision of alternate air inlet and gas outlet orifices.

The process above described, while conveniently carried out in apparatus of the general type hereinbefore disclosed, is perfectly general in its scope and is not restricted to the operation of any particular form of apparatus. According to the process of the present invention, the gaseous mixture, as, for example, a mixture comprising nitrogen and oxygen, is introduced into the path of a long steady arc at a plurality of points along said arc between suitable electrodes. After entering the arc, the gases pass in the direction of the length of the arc for a distance sufficient to complete the desired reaction, this distance being relatively small as compared to the total arc length. The treated gases are then removed at a plurality of exit points along the arc path. The gases in the immediate neighborhood of the electrodes are best removed separately, since such gases usually contain impurities resulting from the breaking down of the electrodes. Such separately removed gases may of course be purified in any suitable way and may then be combined with the products taken from intermediate portions of the arc.

Briefly stated, the present process may be said to comprise maintaining a plurality of more or less independent gas currents entering the path of a long arc, traveling relatively short distances in the path of such arc, and then leaving the arc at a number of spaced exits along the same. In this way, the gases to be treated, instead of traveling the whole length of the arc, are exposed to its influence for only the distance necessary to effect the desired reaction. The velocity of the circulating gases may therefore be kept so low as entirely to obviate all danger of blowing out the arc, while the yield of products from a single long arc is nevertheless relatively large.

What I claim as my invention and desire to secure by Letters Patent of the United States is:—

1. An electric furnace comprising an electrode chamber, a pair of electrodes suitably positioned therein, and a plurality of alternately disposed air inlets and gas outlets between the electrodes.

2. An electric furnace for treating gases or gas mixtures, comprising electrodes and a series of air inlet and gas outlet orifices alternating with each other, a gas conduit communicating with the two gas outlet orifices nearest the electrodes and a main gas conduit communicating with all the remaining gas elements.

3. An electric furnace comprising a plurality of superposed annular elements surrounding an axial gas shaft, said elements being alternately provided with air inlets and gas outlets.

4. An electric furnace comprising a series of annular elements surrounding an axial gas shaft and provided with alternate air inlets and gas outlets, and cooling means in said gas outlets.

5. An electric furnace for treating gases comprising an elongated electrode chamber, electrodes arranged at opposite ends of said chamber, and a plurality of alternately disposed means intermediate said electrodes for introducing and for withdrawing gases.

6. An electric furnace having suitable walls inclosing a central shaft, a suitably energized electrode at each end of said shaft, and a plurality of means located at different points along said shaft for supplying gases thereto and for withdrawing gases therefrom.

7. An electric furnace having suitable walls inclosing a central shaft, a suitably energized electrode at each end of said shaft, and a plurality of means located at different points along said shaft for supplying gases thereto and for withdrawing gases therefrom, said supplying and withdrawing means being alternately disposed.

8. The process of producing oxids of nitrogen, which comprises establishing a long steady arc between a pair of electrodes, introducing gases containing nitrogen and oxygen into the path of said arc at a plurality of points between said electrodes, and withdrawing reaction products at a plurality of other points between said electrodes, the points of introduction and withdrawal being in alternate arrangement along the length of said arc.

9. The process of producing oxids of nitrogen, which comprises establishing a long steady arc between a pair of electrodes, introducing a mixture comprising nitrogen and oxygen into said arc, passing the mixture in the path of and in the direction of the length of said arc for a distance sufficient to complete the desired reaction, and separately withdrawing portions of the treated mixture from the path of the arc at a plurality of points along said path.

10. The process of producing oxids of nitrogen, which comprises establishing a long steady arc between a pair of electrodes, introducing a plurality of streams of a mixture comprising oxygen and nitrogen into said arc at a plurality of spaced points located along the length of said arc, causing each such stream of said mixture to travel a relatively short distance longitudinally in said arc, and removing reaction products at a plurality of other points.

11. The process of producing oxids of nitrogen, which comprises establishing an elongated arc between a pair of electrodes, introducing a gaseous mixture comprising nitrogen and oxygen into said arc, causing said mixture to travel in the path of and in the direction of the length of said arc, and removing portions of the treated gaseous mixture at a plurality of points along said arc, the portions of the mixture in the vicinity of the electrodes being removed separately from those portions of the mixture more remote from the electrodes.

12. The process of producing oxids of nitrogen, which comprises establishing an elongated arc between a pair of electrodes, introducing a gaseous mixture comprising nitrogen and oxygen into said arc, causing said mixture to travel in the path of and in the direction of the length of said arc, removing gases at a plurality of points between and spaced away from said electrodes, separately removing impure gases at points in the immediate vicinity of the electrodes, and separately treating said impure gases.

13. The process of oxidizing nitrogen which comprises establishing and maintaining a long arc between electrodes, feeding air to and removing oxidized products from said arc at points between and spaced away from said electrodes, and separately removing products formed in the immediate vicinity of the electrodes.

In witness whereof I have signed this specification in the presence of two witnesses.

HARRY PAULING.

Witnesses:
MATHILDE R. HELD,
LOUIS MUELLER.